United States Patent
Bohlender et al.

(10) Patent No.: US 6,897,416 B2
(45) Date of Patent: May 24, 2005

(54) AIR CURRENT INTERRUPTION DETECTION RESPONSIVE TO CONSUMED PTC HEATER POWER

(75) Inventors: Franz Bohlender, Kandel (DE); Michael Zeyen, Landau/Queichheim (DE)

(73) Assignee: Catem GmbH & Co. KG, Herxheim Bei Landau (DE)

( * ) Notice: Subject to any disclaimer, the term of this patent is extended or adjusted under 35 U.S.C. 154(b) by 0 days.

(21) Appl. No.: 10/389,252

(22) Filed: Mar. 14, 2003

(65) Prior Publication Data

US 2003/0183619 A1 Oct. 2, 2003

(30) Foreign Application Priority Data

Mar. 28, 2002 (EP) .......................................... 02007160

(51) Int. Cl.[7] .................................................. F24H 3/00
(52) U.S. Cl. ..................... 219/494; 219/202; 392/360
(58) Field of Search ................................ 219/494, 492, 219/202, 505; 392/360–369, 379–385

(56) References Cited

U.S. PATENT DOCUMENTS 6,262,400 B1    7/2001    Urbank et al.

FOREIGN PATENT DOCUMENTS

| DE | 100 26 361 A1 |   | 11/2001 |
|----|---------------|---|---------|
| JP | 60-145196     | * | 7/1985  |
| JP | 5-293297      | * | 11/1993 |
| JP | 6-134193      | * | 5/1994  |
| JP | 7-59994       | * | 3/1995  |
| JP | 8-173698      | * | 7/1996  |
| JP | 8-182896      | * | 7/1996  |
| JP | 10-235092     | * | 9/1998  |
| JP | 2001-793      | * | 1/2001  |

* cited by examiner

Primary Examiner—John A. Jeffery
(74) Attorney, Agent, or Firm—Boyle Fredrickson Newholm Stein & Gratz S.C.

(57) ABSTRACT

A heating system with PTC heating elements heats a medium that flows. In order to avoid unnecessary heating up of the PTC elements when the streaming fails, the required heat output that is to be generated by the PTC elements is compared to the electrical power actually consumed and, if a specified threshold value is under-run, the required heat output that was set is reduced accordingly.

19 Claims, 6 Drawing Sheets

AIR CURRENT INTERRUPTION DETECTION RESPONSIVE TO CONSUMED PTC HEATER POWER

BACKGROUND OF THE INVENTION

1. Field of the Invention

The invention refers in general to an electrical heating system and to a control unit for a motor vehicle heating system. In particular, the invention refers to those electrical heating systems which have PTC-Elements and which are used to heat the passenger compartment of a motor vehicle.

2. Description of the Related Art

For the application in motor vehicles, Electrical Heating Systems are used to heat the passenger compartment of the vehicle and its engine—in particular in those vehicles with combustion engines that have been optimised for low fuel consumption. Such heating systems are also suitable in other application fields, for example, in room climate control, within industrial systems and in household appliances and such like.

The increased efficiency of combustion engines, which have been optimised for low fuel consumption, leads to a considerable reduction in the amount of heat generated within the vehicles. Consequentially, on journeys where the engine is only partially loaded, a very much reduced heating of the vehicle interior is obtained. To redress the balance in this deficit, auxiliary electrical heaters are utilised, in particular in vehicle air conditioning systems.

Such motor vehicle heating systems consist of radiator elements which are made up of PTC heating elements, which are mounted within a frame and secured by means of spring elements. PTC elements are temperature dependent semiconductor resistances whose electrical resistance increases as the temperature rises. When an electrical potential is applied across such PTC elements, an electrical current flows through them, the amount of which is dependent on their resistance. The PTC elements are thus heated up to a predetermined temperature. The heat that is so generated by these PTC elements is then delivered into a flowing stream of air or water.

Because of their inherent characteristic of being able to increase their electrical resistance exponentially when the temperature increases above a characteristic value, PTC elements can be utilised as self regulating heating elements, since, when the characteristic temperature is attained, they automatically, independently, regulate themselves back. By means of this self regulatory process of the PTC elements, the consumed electrical energy corresponds exactly to the delivered thermal energy.

A fault may occur, however, when the air or water flow is interrupted, particularly when the fan generating the air flow, or the pump providing the water current, fails. In such a case, the temperature of the PTC heating element increases up to the maximum PTC temperature. As a result of this, the electrical power is reduced to a value which is only a fraction of the maximal possible power.

A fault can also occur when the control of the electrical heating system reduces the input air flow significantly or interrupts it completely without reducing the corresponding amount of heat that is to be generated. Such a situation can occur because of a fault within the automatic heating controller and/or when the heating system is manually regulated (misuse).

This temperature dependence of the electrical power $P_{el}$, which is converted into heat by the PTC element, is shown graphically in FIG. 2. plotted against the temperature of the PTC element. For a given voltage supply, a working point is established within the PTC element which is dependent on the ambient temperature, that is, the air temperature, and the heat conducted from the PTC element to the medium that is to be warmed. Such a working point $A_1$, is graphically displayed in FIG. 2 for the temperature $T_1$.

Should a fault in the input air flow occur, the PTC element will become warmer because the generated heat cannot be dissipated. The temperature of the PTC element therefore rises. Its working point shifts further downwards along the plotted curve as shown by the new working point $A_2$ in FIG. 2 corresponding to the temperature $T_2$. Thereby, the amount of generated heat and the corresponding amount of electrical power consumed is reduced.

In such a case, the residual power consumption is between 6% and 8% of the maximum rated power value; for an electrical heating system rated at 1 kW maximum, such residual power consumption still lies between 60 watts and 80 watts.

Even when the interior heating of a motor vehicle fails because of a breakdown of the fan, electrical power is nevertheless consumed. As a consequence, the electrical heating system, especially the radiator elements, can heat up to a much higher temperature than is encountered in normal operation. This temperature, which lies significantly above normal temperatures, can lead to consequential damage to components in the vicinity, for example, the melting of plastic fasteners.

SUMMARY OF THE INVENTION

The task of this invention is to specify an electrical heating system using PTC elements which can detect such a failure situation and to specify a control unit for that purpose.

In compliance with the first aspect of the invention, a PTC heating element, for heating an air current with a specified required heat output, is controlled. The air current is generated by a fan whose throughput of air is also regulative. The required heat output of the PTC element, as well as the required air throughput of the fan, are limited downwards to minimal values by specified lower boundaries. Concurrently, the power removed from the PTC element is measured and compared to a threshold value. This threshold value is so chosen so that it is lower than the lower boundary of the pre-selectable required heat output. If the delivered heat output falls below the specified threshold value, a fault in the air current is detected according to the invention.

In accordance with a second aspect of the invention presented here, the threshold value is set dependent on the specified required heat output value. As a result, this threshold value has a direct relationship to the pre-selected required heat output value. If the measured heat output value falls below the current actual threshold value, a fault is detected in the air current.

Other advantageous specific embodiments of the invention are given in the list of sub claims.

BRIEF DESCRIPTION OF THE DRAWINGS

With reference to the diagrams, preferred aspects of the design of the invention are explained in more detail in the following.

Figure 1:
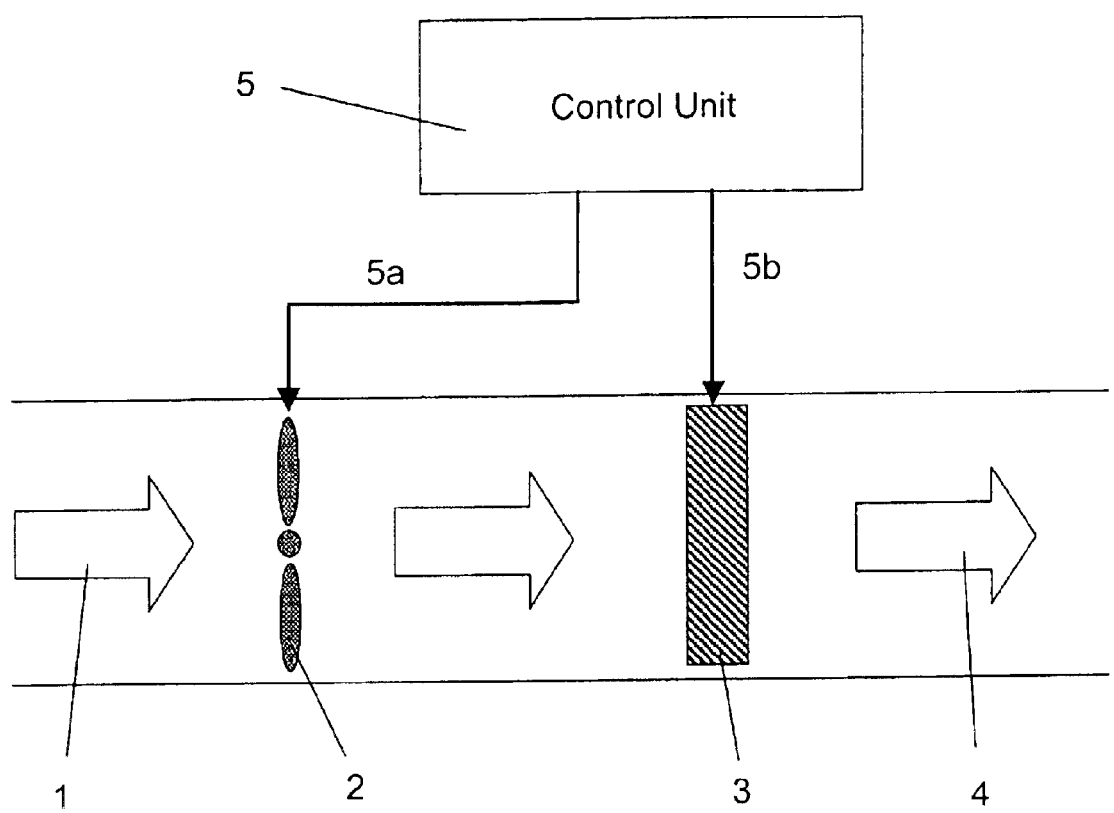
FIG. 1 shows a sketch of the principles of a heating system.
Figure 2:
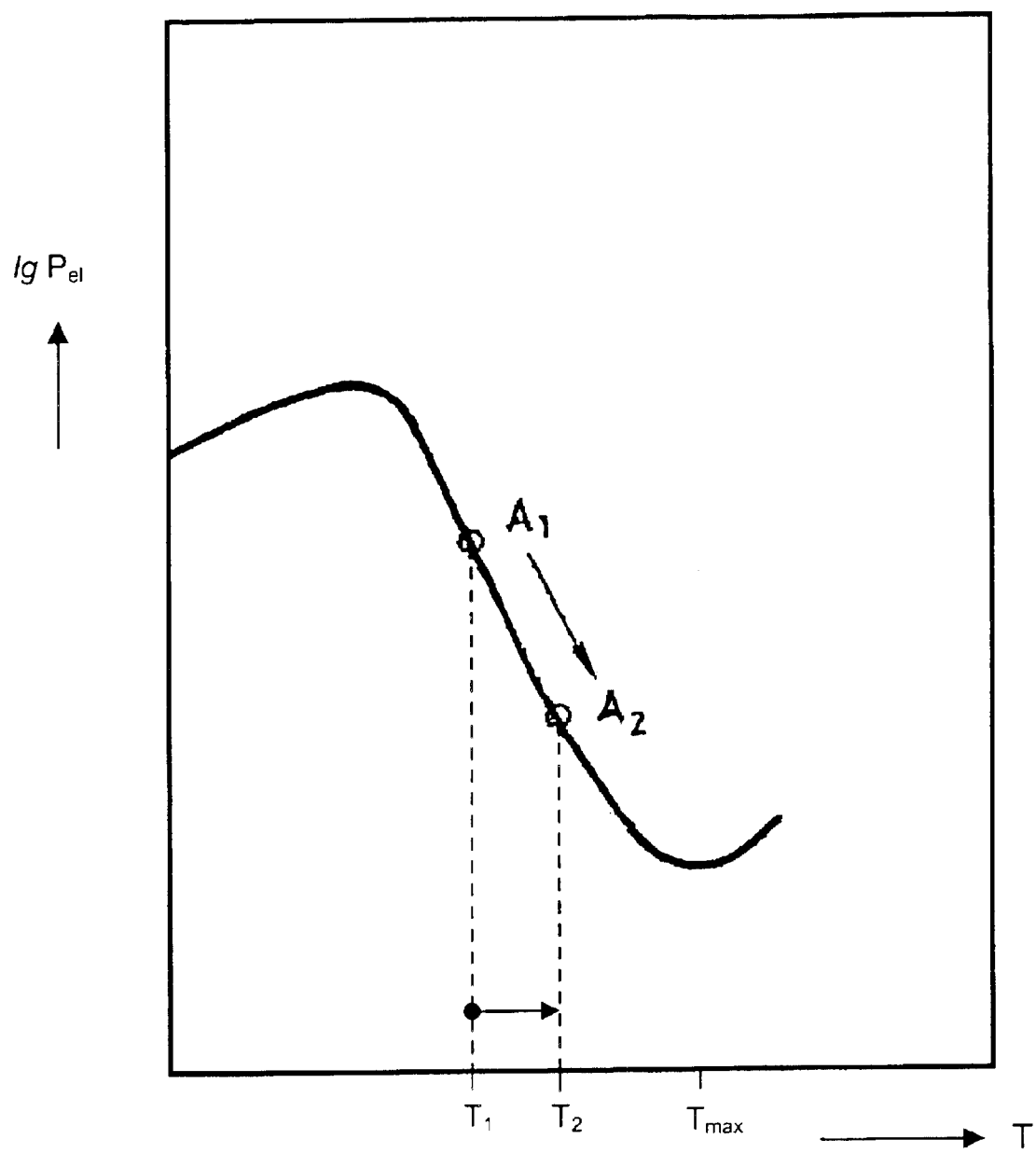
FIG. 2 shows a graph of the variation of the converted electrical power applied to a PTC element against temperature.

The fundamental set up of a heating system based on this invention is shown in FIG. 1.

DETAILED DESCRIPTION OF THE PREFERRED EMBODIMENT

A medium 1 that is to be heated is directed into a heating device 3 with the assistance of a delivery device 2. The heated medium 4 can then, according to the intended use, be applied especially to the heating of motor vehicle's interior.

An auxiliary electrical heating for motor vehicles normally consists of a heating unit 3 containing heating elements together with an associated control unit 5. Such heating elements are normally made out of electrical heating resistances. The heater 3 and the control unit 5 can either be constructed as separate functional units or can be combined into one integrated component.

The heater itself consists preferentially of radiator elements in which PTC heating elements are mounted. Both the radiator elements and the PTC elements are held within a frame with spring clip type elements. In the heating system, the PTC elements are used as self-regulating heating elements which, on reaching the characteristic temperature, govern themselves automatically, whereby the characteristic temperature can be influenced by doping during the manufacturing process.

The control unit 5 applies a voltage across a or the PTC heating element(s) whose value depends on the specified electrical heat output that is to be achieved. Depending on the applied electrical voltage, the current flows through the individual PTC heating elements which then heat themselves up to the corresponding temperature. The radiator elements of the heating system remove the heat from the PTC heating elements and conduct it into the water or air stream.

According to one preferred specific embodiment of the invention, a or the PTC heating element(s) are controlled via pulse width modulation (PWM). The PWM control varies the width of the voltage impulses whose amplitude is fixed at a value which depends on the specified heat output that is to be achieved.

Figure 3:
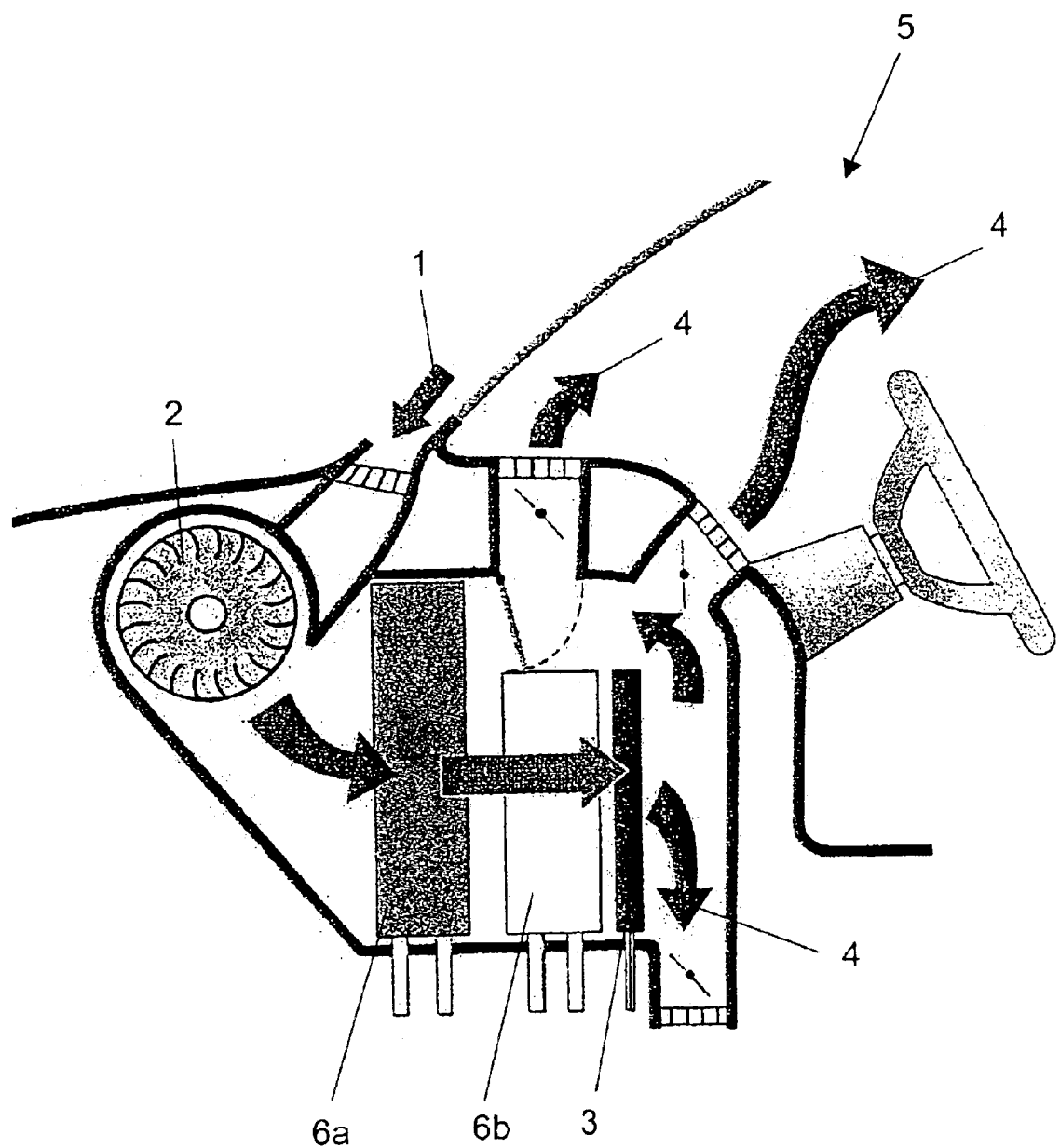
FIG. 3 shows an example of the use of an electrical heating system which is based on this invention.

FIG. 3 shows the application of such a heating system for heating the interior of a motor vehicle. In this example, the heating system according to the invention, is integrated into the motor vehicle's air conditioner. By means of a fan 2, ambient air is sucked in and is then blown through the heater into the vehicle's interior 5. Thereby, when integrated into an air conditioner, the air can be directed over an evaporator 6a and an additional heater 6b before it flows through the auxiliary electric heater 3.

Figure 4:
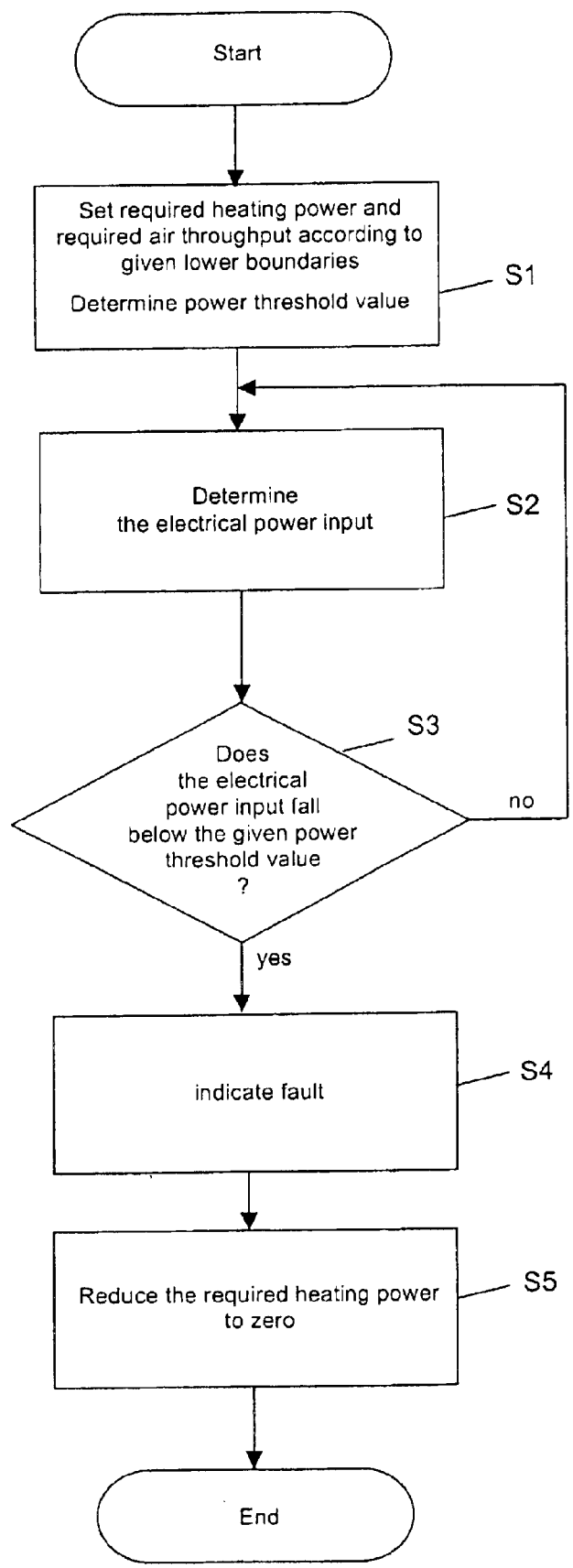
FIG. 4 shows a flowchart of a process running in accordance with the features detailed in the invention.

FIG. 4 presents a flowchart showing process execution according to the features detailed in this invention.

Both the amount of air flowing and its warmth can be regulated by the user. For this purpose, a required heat output value and a required air throughput value are specified. The ranges of the required heat output value and the required air throughput value that can be selected are limited by specified minimal boundary values. Selection of values of the heat output and air throughput below these specified boundaries is not possible. These boundaries, however, are chosen to be so low so as not to influence the 'comfort' aspects of the heating.

The required heat output, chosen by the user, causes the electric heater 3 to be controlled preferentially by the voltage amplitude, or, in the case of a PWM controller, by the impulse rate. In the case of a PWM controller, the voltage impulses become wider as the required heat output increases. The PTC elements of the heater convert the applied electrical energy into heat which is then conducted away into the surroundings. With the specified operating voltage, or alternately, the specified impulse width, a working point is set within the PTC element which is dependant on the ambient temperature, that is, the air temperature and the heat conduction from the PTC element into the air that is to be warmed. As the required heat output is increased, an equilibrium state, characterised by a high resistance with a lower heat conductivity, is reached, as soon as the heat mass generated in the PTC element cannot be conducted away by the air current that is to be heated.

Figure 5:
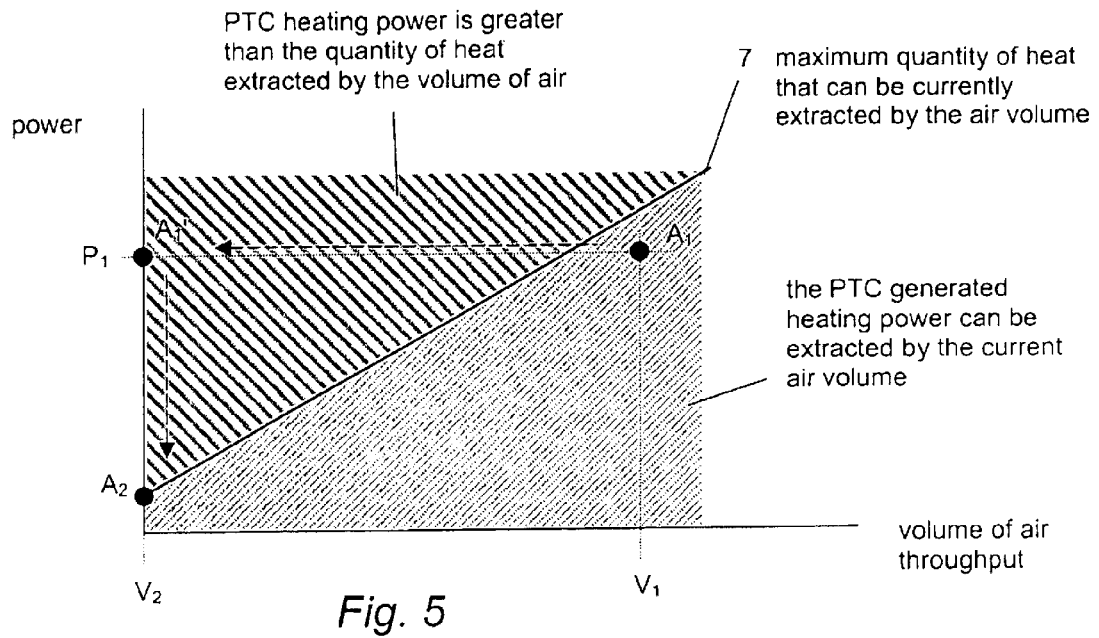
FIG. 5 shows graphically the principles involved on which the invention presented here is based.

The following, with reference to FIG. 5, explains the principles underlying the invention. In the diagram shown in FIG. 5, the X-axis represents the air throughput of the fan and the Y-axis represents the heat output of the PTC element. As the air throughput volume increases, the more is the amount of heat that can be conducted away by this air pro time unit. This relationship is represented with the aid of the solid line 7. This line shows the maximum possible heat output that can be extracted for the given volume of air.

The area of the graph, bound by the heat output and air throughput axes, is divided into two zones, namely, the zone lying below line 7 in which the complete PTC generated heat output can be delivered into the corresponding air volume and the zone lying above line 7 in which the PTC generated heat output is greater than that that can be extracted by the corresponding air volume.

When a working point is chosen for a required heat output value and a required air throughput value which lies above line 7, then the PTC element 3 heats up by that part of the heat that could not be conducted away by the air.

Because of the characteristics of the PTC, the heat output, that can be released by the PTC element, decreases as the PTC element warms up and indeed, it continues to decrease until it reaches a point of thermal equilibrium. Graphically, this process is illustrated in FIG. 5 in that a working point which lies above line 7, moves vertically downwards until it encounters line 7. At this point, the complete heat output generated by the PTC element can be carried away by the air current.

A state of thermal equilibrium when occurring in PTC elements is based on the following equation:

$$U^2/R = I^2 \times R = G_{th}(T - T_u).$$

This equation states that the electrical power, consumed by the PTC element, is equal to the cooling that occurs when the generated heat is given up to the surroundings. In this equation, $G_{th}$ represents the heat conduction value, T the temperature of the heating element and $T_u$ the temperature of the surroundings.

In FIG. 5, a working point $A_1$ is defined for a given value $P_1$ of the required heat output and for a given value $V_1$ of the required air throughput. This working point lies below line 7. The generated heat output can therefore be completely given up into the air volume.

As soon as a fault in the air supply occurs, especially when fan 2 fails, the air throughput falls to zero. As a consequence, the working point A1, illustrated in FIG. 5, shifts across to the new working point $A_1'$. This working point corresponds as before to the heat output $P_1$, but the required air throughput value $V_1$ has now sunk to the value $V_2$=0. The new working point $A_1'$ now finds itself above line 7. The heat generated by the PTC heating element can no longer be carried away. As a consequence, the temperature of the PTC element rises and—according to the PTC characteristics—the heat output that can be given out sinks.

As has been explained before, the heat that can be given out, sinks until the working point reaches line 7, whereby the heat generated by the PTC element can be completely carried away. The state reached after the sinking of the actual heat output is represented in FIG. 5 by the new working point $A_2$.

The invention is so conceived so that a failure of the air current is detected using as little effort as possible. Naturally, it is technically possible to detect a failure of the fan or a fault or interruption in the air supply with the help of additional sensors. An aim of this invention is, however, to avoid the use of additional hardware and to be able to detect a damaging situation without modifications to the existing air delivery and heating systems. To this end, the sinking of the working point to the point $A_2$ is plotted in accordance with the invention.

In step S2, control unit 5, according to the invention presented here, detects what amount of electrical power is actually consumed by the heater 3 and which is conducted away. In addition, the control unit in step 3 checks whether the electrical power, consumed by PTC element 3, which is then given up as heat into the medium, falls below the specified threshold value. If this threshold value is under-run, then such a case will be detected by control unit 5 that a fault exists because the PTC element 3 is not in a position to conduct away enough heat.

When such a threshold value is under-run, then the indication is that a high resistance equilibrium state at the correspondingly high ambient temperature has been attained. As long as electrical power is still being converted into heat, the PTC element and the surroundings are further warmed up.

Such a fault or, alternatively, the misuse of a manual air conditioner, for example, through interruption of the incoming air supply without a reduction of the heat output can be recognised by the comparison detailed above. When the electrical power thence consumed lies below the threshold value, then the control unit detects that a fault is present and, in order to avoid unnecessary wastage of energy, decreases significantly the required heat output that is to be delivered, preferably switching it off altogether (step S5). At the same time, a failure message can be reported to the user, for example, by means of an onboard computer in the motor vehicle.

The threshold value, with which the consumed electrical power is compared, is so chosen so that a fault can always certainly be detected. To this end, the level of the threshold value is such that one can always differentiate unambiguously between an error case and normal running.

In order to detect the sinking of the working point in FIG. 5, a threshold value $P_{lim}$ is determined for the power consumed by the PTC element according to the invention. This power threshold value $P_{lim}$, is set such that it lies under the minimum heat output $P_{min}$ but nevertheless is above the working point $A_2$.

Figure 6:
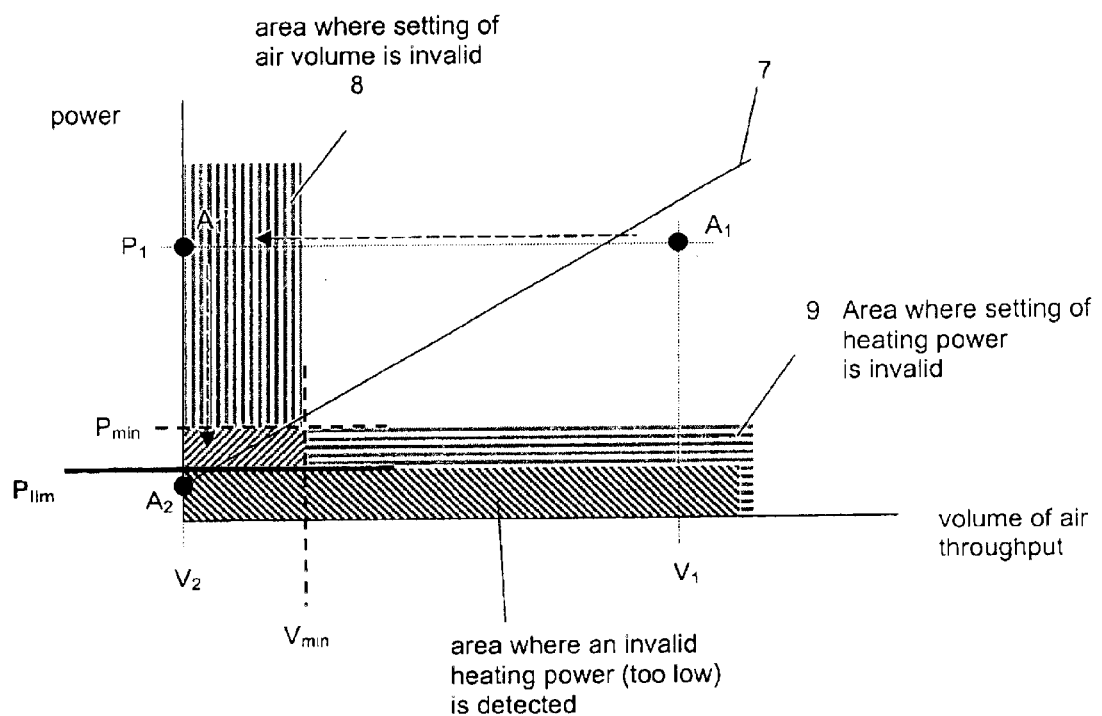
FIG. 6 illustrates the teachings according to the patent shown in the graph in FIG. 5.

This relationship is shown in detail in FIG. 6. In order to avoid the situation whereby working point $A_2$ can be chosen by the user himself, the minimum required heat output value $P_{min}$ and the minimum required air throughput value $V_{min}$ are determined. The shaded areas 8 and 9 in FIG. 6 are designated here as invalid positions for a working point.

The shifting of the working point $A_1$ to the working point $A_1'$ is not determinable without additional hardware effort. Indirectly, this deficit can be detected by automatically shifting working point $A_1'$ downwards to working point $A_2$. This shifting has is based on the PTC characteristic of the heating element 3. The downwards sinking of the working point into the invalid area 9 is easily determinable. To that end, a threshold, for comparison with the actual measured heat output, is determined which lies below $P_{min}$. In FIG. 6 an example is given whereby $P_{lim}$ lies distinctly below $P_{min}$. Using such a particular threshold value, the sinking of the working point can be detected easily and reliably.

In an alternative specific embodiment, the threshold value aligns itself so that it is a certain percentage of the specified required value. The threshold value amounts, at any time, to a determined fraction of the set required value, for instance, 20% of the specified required heat output. If this value is undercut, a fault is present in that specific embodiment should this threshold value deviate from its set fixed relationship to the required heat output.

Figure 7:
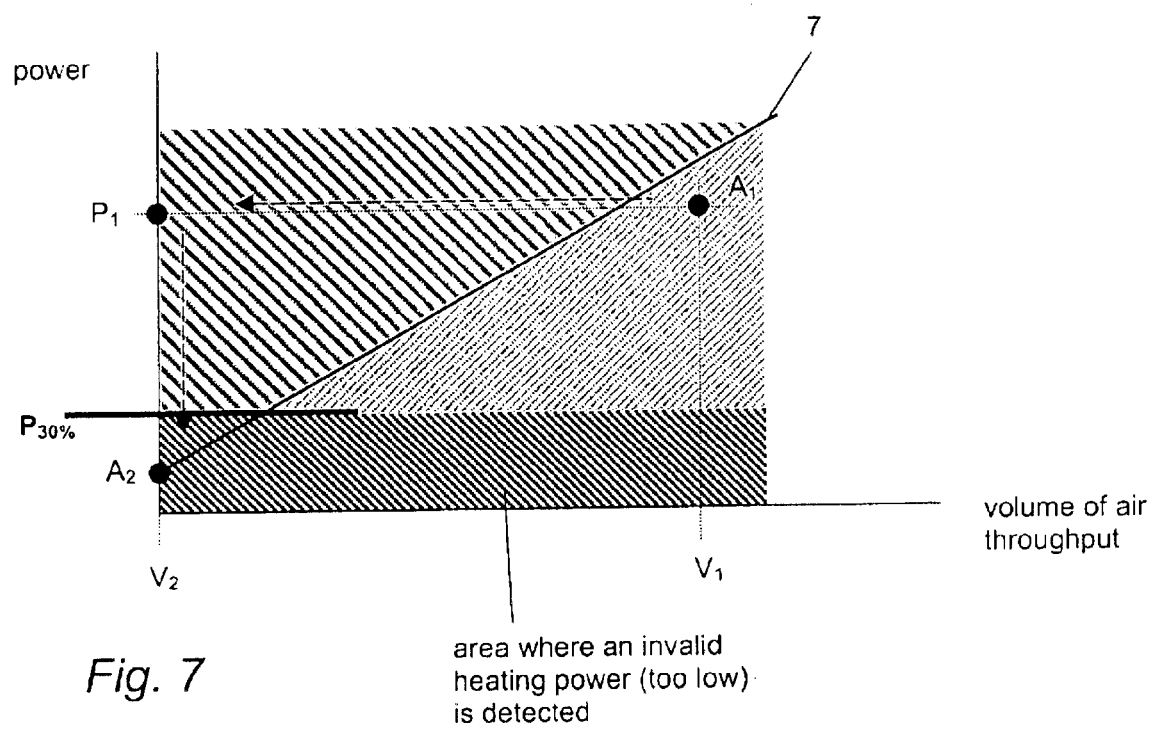
FIG. 7 illustrates the teachings of the invention according to another aspect of the invention presented here, than that which is shown in FIG. 5.

This type of approach is shown in FIG. 7. The power threshold value $P_{30\%}$ is set depending on the specified required heat output. In such a way, a failure of the air stream can be significantly more quickly detected even at high required heat output levels. This specific embodiment also requires that lower boundaries be set for the required heat output and the required air throughput so that the working point $A_2$ can only be reached in the case of a failure of the air current.

In a special refinement of this specific embodiment, the percentage part of the threshold value varies from the specified required value depending on the size of this required value. In the case of a low required value, a failure is already detected when a 40% under cutting takes place, whereas in the case of higher specified required values, an error is detected only when a 20% under cutting of the threshold value has taken place.

The threshold value lies preferably somewhere between 10% and 50% of the specified values. Preferably, threshold values are chosen to be between 15% and 30% of the given value.

The submitted invention is summarly concerned with a heating system with PTC heating elements that heats a flowing medium. In order to avoid unnecessary heating of the PTC elements when a failure in the streaming medium occurs, the required heat output that is produced by the PTC elements is compared to the actual electrical power consumed and when a specified threshold value is under-cut, the set required heat output is reduced accordingly.

Both the required heat output and the real electrical power consumed (actual power input) can be measured using the voltage and current values across the contacts of the PTC elements. In the case of external control of the PTC elements, the current and voltage values in the connecting lines can be used. In the case of integrated methods of construction of the control unit and the heating elements, the values are taken across the PTC elements' contacts. By using the value of the voltage with which the PTC elements are controlled, the required heat output can be determined, whilst the current which flows over the contacts or through the connecting lines is used to determine the actual heat output. In the case of a PWM controller, the actual voltage and current values must be subject to an averaging over time in order to obtain effective values out of the pulse shaped values and thus to obtain the actual specified or consumed heat output.

Motor vehicle auxiliary heaters according to the invention are preferably developed as multiple stage devices in that the individual heating stages are controlled in either serial or parallel configurations. In the case of parallel control, the same voltage or, alternately, a voltage with the same impulse rate, is applied across all heating stages. Accordingly, all heating elements work at the same working point. In order to detect a failure in the air current, it is sufficient to monitor the required and actual heat output of one of the heating stages. When a failure is detected, the heat output of all heating stages is uniformly reduced.

In the case of serial control, the individual heating stages are controlled sequentially depending on the required heat output. In the case of a low heat requirement, only one of the heating stages which has an adequate required heat output, is controlled. If the heat requirement increases beyond that which can be generated by the first heating stage, then the second heating stage is controlled according that part of the heat output that could not be converted by the first heating stage. At maximum heat requirements, all heating stages are controlled with the same voltage or impulse width respectively. In such a control, preferably only the required and actual heat output of the lowest stage is monitored. If the actual heat output falls below the specified threshold value, then the required heat output of the complete heater is lowered accordingly.

In both parallel as well as in serial control, more or all of the heating stages can be so equipped that their required and actual heat output values can be recorded and monitored. In this way, the reliability of the PTC temperature protection mechanism can be increased.

If all heating stages of a heater are monitored, according to the invention, then the case may occur where the failure of just one heating stage is detected. The reason for this can be due to different temperature distributions or to different streaming characteristics over the individual heating stages so that, for example, by a partial failure of the incoming air stream, the air feed to only one of the heating stages sinks dangerously. Correspondingly, according to one specific embodiment of the invention, only this PTC element is switched off.

If the danger of overheating of one heating stage is detected, then, according to another specific embodiment of the invention, the required heat output of all heating elements is reduced on the grounds of safety. As a result of this, a significant variation in the loading of the electrical circuit of the motor vehicle can occur, which may, for example, manifest itself in a fluctuation in the brightness of the motor vehicle's lighting system. In order to avoid extreme fluctuations within the electrical circuit of the motor vehicle, according to a further preferred specific embodiment of the invention, the required heat output is reduced little by little. Such a reduction takes place preferentially over a number of intermediate stages within a specified time interval.

We claim:

1. An electrical heater for the heating of air, comprising:
   a fan for generating an air current, at least one PTC element for heating the air current and a control device for setting the effective air throughput from the fan and for setting the generated heat output from one of the PTC elements, wherein the control device is configured such as to exclude the setting of the air throughput and the heat output below specified lower boundaries ($P_{min}$, $V_{min}$), and wherein the electrical heater contains,
   a measurement device configured to determine the power consumed by the PTC element,
   a comparison device configured to compare the power measured by the measurement device with a specified power threshold value (Plim), which is smaller than the lower boundary of the adjustable heat output (Pmin), and
   a detection device configured to recognize an interruption of the air current from the fan when the comparison device determines that the measured power consumed by the PTC element drops below the specified power threshold value (Plim).

2. An electrical heater according to claim 1, wherein the specified power threshold ($P_{lim}$) value lies within a range of between 20% and 80% of the lower boundary of the heat output that is to be generated by the PTC element, preferably between 40% and 60%.

3. An electrical heater for the heating of air, comprising:
   a fan for generating an air current, at least one PTC element for heating the air current and a control device for setting the effective air throughput from the fan and for setting the generated heat output from one of the PTC elements, wherein the control device is configured such as to exclude the setting of the air throughput and the heat output below specified lower boundaries ($P_{min}$, $V_{min}$), and wherein the electrical heater additionally includes,
   a measurement device configured to determine the power consumed by the PTC element,
   a comparison device configured to compare the power measured by the measurement device with a specified power threshold value, which corresponds to a specified fraction of the adjustable heat output, and
   a detection device configured to recognize an interruption of the air current from the fan when the comparison device determines that the measured power consumed by the PTC element drops below the specified power threshold value.

4. An electrical heater according to claim 3, wherein the specified power threshold value lies in a range which is between 10% and 50% of the set heat output.

5. An electrical heater according to claim 1, wherein the control device regulates the heat output to be generated to zero when the detection device determines that an interruption of the air current is present.

6. An electrical heater according to claim 1, wherein the detection device controls an indicator for an acoustical and/or optical indication of the interruption when the existence of an interruption of the air current is detected.

7. An electrical heater according to claim 1, wherein the setting of the heat output to be generated by the PTC elements results from pulse width modulation control of the PTC element.

8. A motor vehicle interior heater with an electrical heater according to the claim 1.

9. A control unit for an electrical heater with a fan for generating an air current and with at least one PTC element for heating the air current, whereby a specific value of the effective air throughput from the fan and a specific value of the heat output to be generated by the PTC element is selectable using the control unit, wherein the control unit is configured such that on selection of a particular air throughput and a particular heat output actual specified lower boundary values ($P_{min}$, $V_{min}$) cannot be under-run and such that the control unit compares the power consumed by the PTC element with a specified power threshold value ($P_{lim}$), which is smaller than the lower boundary of the adjustable heat output ($P_{min}$), and such that it detects an interruption in the air current from the fan by determining that the measured power consumed by the PTC element falls below the specified power threshold value ($P_{lim}$).

10. A control unit for an electrical heater with a fan for generating an air current and with at least one PTC element for heating the said air current, whereby a value of the air throughput to be caused by the fan and a specific value of the heat output to be generated by the PTC element is selectable by the control unit, wherein the control unit is configured such that on selection of a particular air throughput and a particular heat output actual specified lower boundary values (Pmin, Vmin) cannot be under-run and such that the control unit compares the power consumed by the PTC element with a specified power threshold value (P30%), which corresponds to a specified fraction of the adjustable heat output, and that it shall detect an interruption in the air current from the fan when the measured power consumed by the PTC element under-runs the power threshold value ($P_{30\%}$).

11. An electrical heater comprising:

a fan configured to generate an air current;

at least one PTC element configured to heat the air current;

a control device configured to set an effective air throughput from the fan and to set a generated heat output from the PTC element, wherein the control device is configured such as to exclude the setting of the air throughput and the heat output below specified lower boundaries ($P_{min}$, $V_{min}$);

a measurement device configured to determine the power consumed by the PTC element;

a comparison device configured to compare the power measured by the measurement device with a specified power threshold value ($P_{lim}$), which is smaller than the lower boundary ($P_{min}$) of the set heat output; and a detection device configured to recognize an interruption of the air current from the fan when the comparison device determines that the measured power consumed by the PTC element drops below the power threshold value (Plim).

12. An electrical heater according to claim 11, wherein the given threshold value lies within a range of between 20% and 80% of a lower boundary of the set heat output.

13. An electrical heater comprising:

a fan configured to generate an air current;

at least one PTC element configured to heat the air current;

a control device configured to set the effective air throughput from the fan and to set the generated heat output from the PTC element, wherein the control device is configured such as to exclude the setting of the air throughput and the heat output below specified lower boundaries ($P_{min}$, $V_{min}$);

a measurement device configured to determine the power consumed by the PTC element;

a comparison device configured to compare the power measured by the measurement device with a specified power threshold value, which corresponds to a specified fraction of the set heat output; and a detection device configured to recognize an interruption of the air current from the fan when the comparison device determines that the measured power consumed by the PTC element drops below the power threshold value.

14. An electrical heater according to claim 13, wherein the specified power threshold value lies in a range which is between 10% and 50% of the set heat output.

15. An electrical heater according to claim 11, wherein, when the detection device determines that an interruption of the air current is present, the control device sets the heat output to zero.

16. An electrical heater according to claim 11, wherein, when the existence of an interruption of the air current is detected, the detection device controls an indicator for at least one of an acoustical and an optical indication of the interruption.

17. An electrical heater according to claim 11, wherein the setting of the heat output to be generated by the PTC element results from pulse width modulation control of the PTC element.

18. A control unit for an electrical heater with a fan for generating an air current and with at least one PTC element for heating the air current, whereby a specific value of the effective air throughput from the fan and a specific value of the heat output to be generated by the PTC element is selectable using the control unit, wherein the control unit is configured such that on selection of a particular air throughput and a particular heat output actual specified lower boundary values ($P_{min}$, $V_{min}$) cannot be under-run and such that the control unit compares the power consumed by the PTC element with a specified power threshold value ($P_{lim}$), which is smaller than the lower boundary ($P_{min}$) of the set heat output, and wherein the control unit detects an interruption in the air current from the fan by determining that the measured power consumed by the PTC element falls below the specified power threshold value ($P_{lim}$).

19. A control unit for an electrical heater with a fan for generating an air current and with at least one PTC element for heating the air current, whereby a value of the air throughput to be caused by the fan and a specific value of the heat output to be generated by the PTC element is selectable by the control unit, wherein the control unit is configured such that on selection of a particular air throughput and a particular heat output actual specified lower boundary values ($P_{min}$, $V_{min}$) cannot be under-run and such that the control unit compares the power consumed by the PTC element with a specified power threshold value, which corresponds to a specified fraction of the set heat output, and wherein the control unit is configured to detect an interruption in the air current from the fan when the measured power consumed by the PTC element under-runs the specified power threshold value.

* * * * *